United States Patent [19]

Haigh

[11] Patent Number: 5,251,396
[45] Date of Patent: Oct. 12, 1993

[54] FISHING TACKLE

[75] Inventor: Leonard Haigh, Evesham, United Kingdom

[73] Assignee: Entaco Limited, United Kingdom

[21] Appl. No.: 835,430

[22] Filed: Feb. 19, 1992

[30] Foreign Application Priority Data

Jul. 25, 1990 [GB] United Kingdom ............... 9016320

[51] Int. Cl.[5] ...................... A01K 91/00; A01K 91/18
[52] U.S. Cl. ................................. 43/42.74; 43/44.84; 43/44.85
[58] Field of Search ................ 43/44.83, 42.49, 42.74, 43/43.15, 44.84, 44.85; 24/666, 701

[56] References Cited

FOREIGN PATENT DOCUMENTS 2629984 10/1989 France .
1583797 2/1981 United Kingdom .
2074207 10/1981 United Kingdom .

Primary Examiner—Kurt C. Rowan
Attorney, Agent, or Firm—Armstrong, Westerman, Hattori, McLeland & Naughton

[57] ABSTRACT

A fishing tackle comprising a line, an attachment member comprising a sleeve rotatably mounted on the line, the sleeve having an attachment means to which an intermediate member is secured for movement of the intermediate member relative to the attachment member and the intermediate member being connected to a snood.

13 Claims, 4 Drawing Sheets

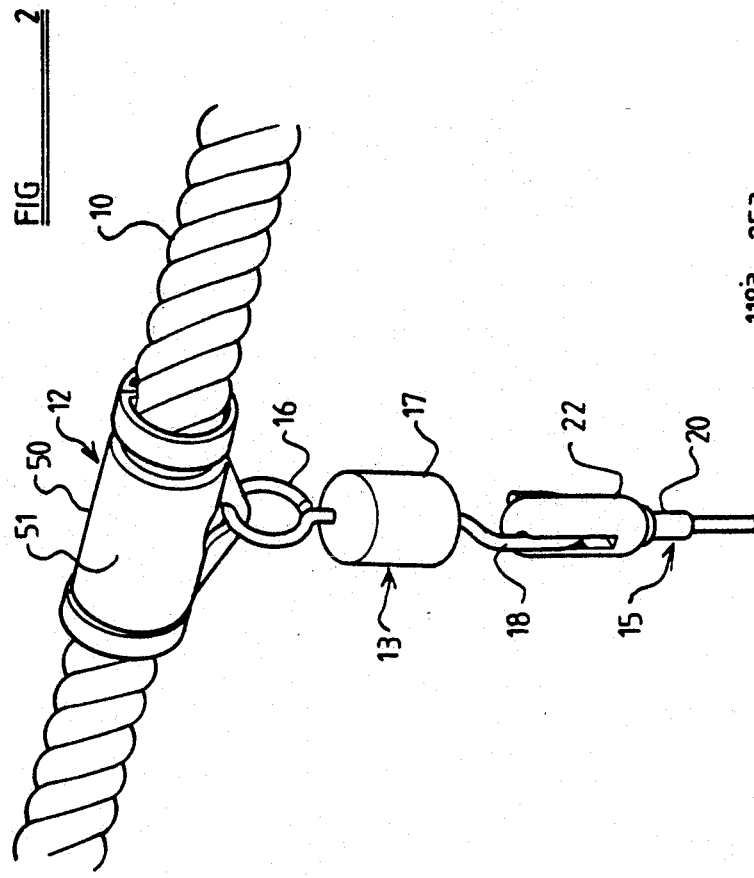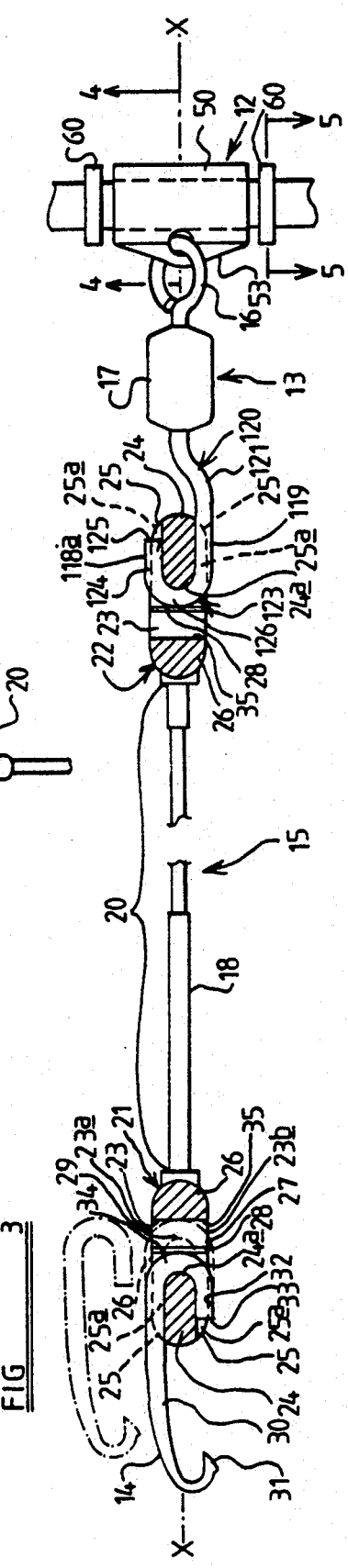

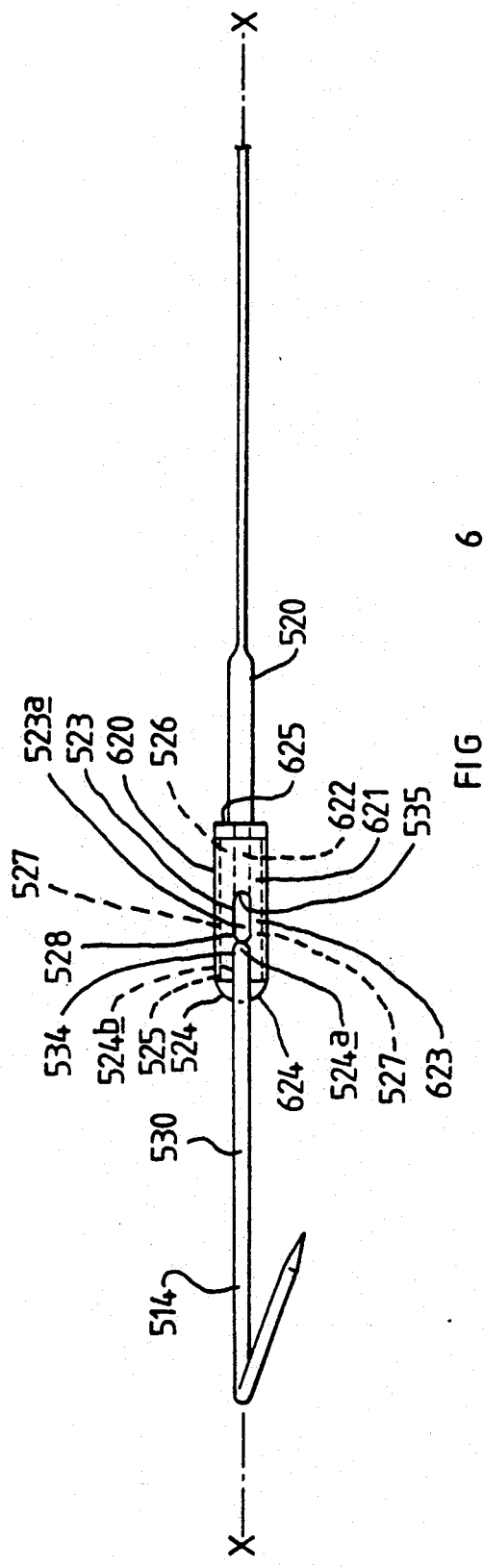
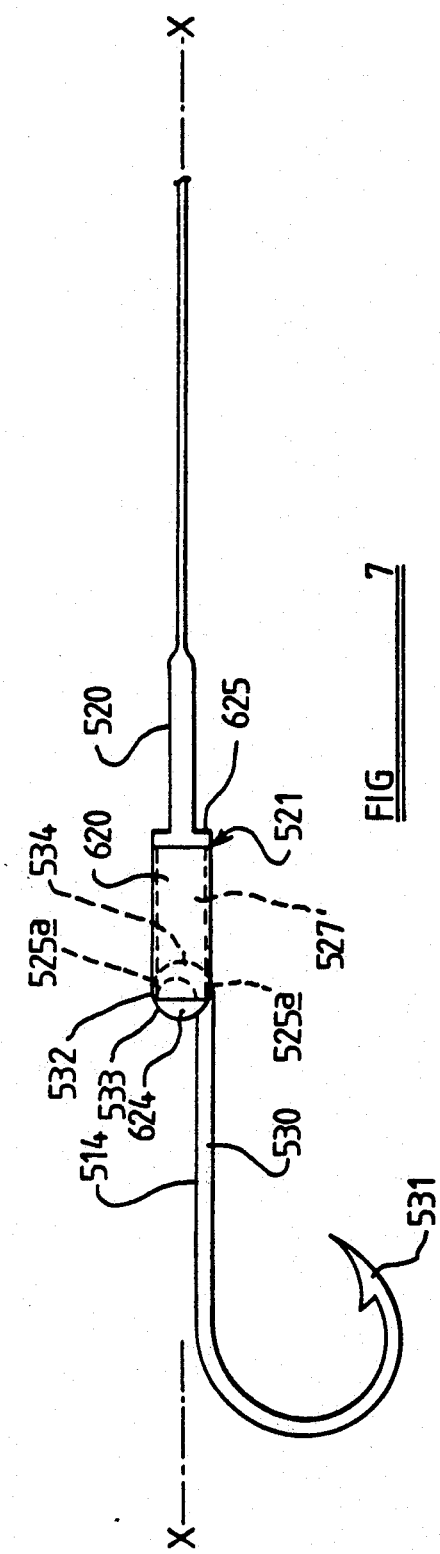

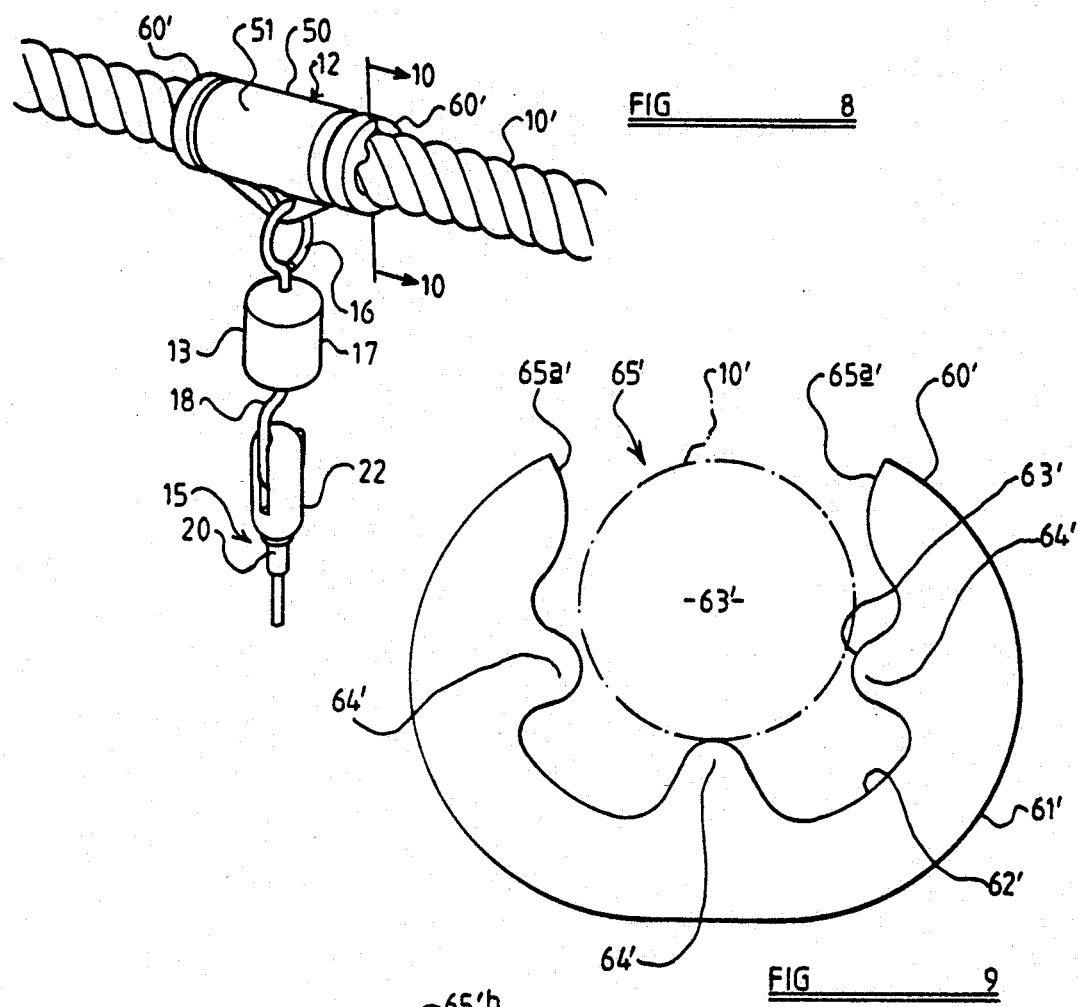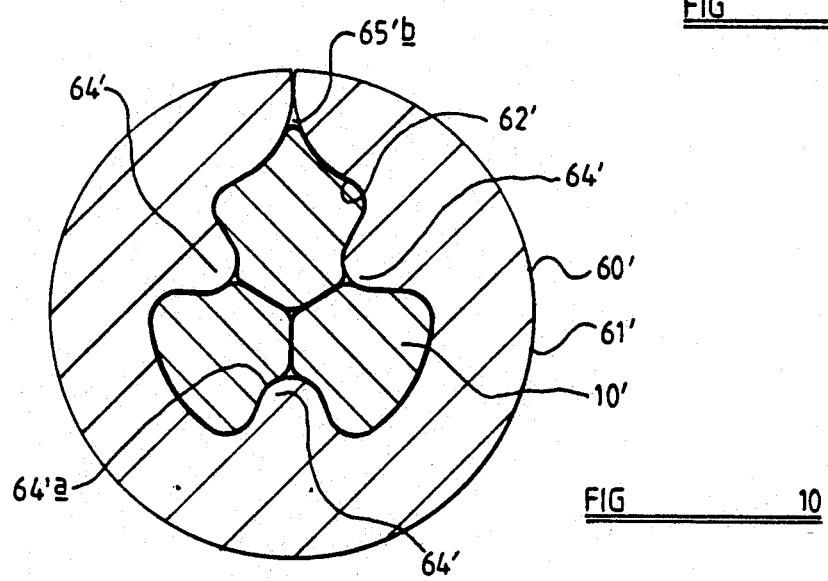

FISHING TACKLE

This is a continuation-in-part of International Application PCT GB91/01230 with International filing date of Jul 23rd 1991 which designates the United States and is now abandoned.

BACKGROUND TO THE INVENTION

This invention relates to fishing tackle and particularly to an attachment member for connecting a snood to a line such as a fishing line.

Fishing lines, particularly long lines, are used which have many snoods connected thereto, spaced along the line. To facilitate handling and use of the line it is preferred for the snood to be rotatable about the line and for the snood to be otherwise pivotable relative to the line.

An object of the invention is to provide a new and improved attachment member for connecting a snood to a line and a fishing tackle including the same.

SUMMARY OF THE INVENTION

According to one aspect of the present invention we provide an attachment member comprising a sleeve rotatably mounted on the line, the sleeve having an attachment means to which an intermediate member is secured for movement of the intermediate member relative to the attachment member and the intermediate member being connected to a snood.

The sleeve may have a wall defining a passage in which the line may be received with the wall contacting the line.

The sleeve may be generally cylindrical and may have a generally outwardly extending lug comprising said attachment means.

The sleeve may have a slit in the cylindrical wall extending longitudinally of the sleeve.

The slit may be disposed at the base of the lug.

The slit may have an initial width sufficient to permit of passage of the line therethrough into said passage and the clip may be deformable to close the slit to retain the line in the passage.

The lug may be provided with an opening to provide said attachment means.

The sleeve may be made from an initially flat blank of suitable material such as stainless steel and may be formed by bending said blank to a cylindrical shape provided with said lug, the slit being formed between one free end of the blank and a surface portion of the lug adjacent the base thereof.

Preferably the intermediate member is secured to the attachment means in a manner to enable the intermediate member to move relative to the attachment member about two relatively perpendicular axes of rotation.

One of said axes may extend in a direction which has at least a component parallel to the longitudinal axis of the long line and the other of said axes may extend in a direction which has a component at least transverse to the long line. Preferably said one axis is parallel to said longitudinal axis and said other axis is tangential to a circle which is normal to the longitudinal axis of the long line.

For example, the intermediate member may comprise a first securing element of loop configuration which inter-loops with the attachment means.

The intermediate member may comprise a second connecting element to which the snood is connected.

Preferably the first and second elements of the intermediate member are connected to permit of rotation of the second element relative to the first element.

Where the intermediate member is generally elongate, the axis of rotation of the second element relative to the first element may comprise a longitudinal axis of the intermediate member.

A stop means may be provided to prevent movement of the attachment member along the line.

The stop means may comprise a clip having a loop closed or substantially closed around the line and being engaged with the line adjacent the attachment member.

The line may comprise twisted filamentary strands and the clip may have at least one inwardly extending part which penetrates into the line between the strands.

Preferably, when the line is a "hard lay" line the clip may have two inwardly extending parts disposed side by side and extending generally radially inwardly.

The clip may be generally annular in cross-section perpendicular to the line.

The clip may initially be provided with a gap between said inwardly extending parts of a width to permit passage of the line therethrough, following which the clip may be closed onto the line to bring the inwardly extending parts into contact or closely adjacent each other and to cause them to penetrate the line between the strands.

The clip may be made by bending from strip material of generally rectangular cross-section.

Alternatively, particularly when the line is a "soft lay" line, the clip may have a plurality of inwardly extending parts which are disposed at spaced positions around the inner surface of the loop and are of such configuration as to penetrate the line between adjacent strands.

The clip may have a plurality of generally radially inwardly extending parts, having convex inner end portions, to penetrate the line between the strands.

The clip may be generally annular in cross-section perpendicular to the line.

The clip may initially be provided with a gap between end parts of the loop, the gap being of a width to permit passage of a line therethrough, following which the clip may be closed onto the line to close or reduce the width of the gap and to cause said parts to penetrate the line between adjacent strands.

The clip may have a recess in the wall of the loop adjacent the ends of the loop to avoid damage to the rope.

Said end parts of the loop may be configured to provide said recess as a result of said end parts being chamfered, preferably of curved configuration. The clip may be made from a blank by a severing operation such as stamping. Preferably the thickness of the blank corresponds to the width of the stop.

Preferably the stop means comprises a pair of clips arranged either side of the attachment member along the line.

According to a second aspect of the invention we provide a method of attaching an attachment means of the first aspect of the invention to a line comprising passing the line through said slit into said passage and then deforming the attachment member to close or substantially close the slit so that the attachment member is mounted on the line with the wall of the passage in contact with the line and able to rotate about the line.

The method may include a further step of securing stop means to the line at opposite ends of the attachment member to prevent movement of the attachment member along the line.

The step of securing said stop means may include the step of passing the line through a gap in the stop member then deforming the stop member so as to encircle the line and cause a portion of the stop member to penetrate the line.

BRIEF DESCRIPTION OF THE DRAWINGS

Embodiments of the invention will now be described with reference to the accompanying drawings in which

FIG. 2 is a fragmentary perspective view to an enlarged scale of the line of FIG. 1;

FIG. 3 is a fragmentary side view partly in section of the line of FIG. 1;

FIG. 6 is a fragmentary plan view of a modification of the fishing tackle of FIGS. 1-5, FIG. 7 is a fragmentary side view of the modification of FIG. 6, FIG. 8 is a fragmentary perspective view of an alternative embodiment of the invention, FIG. 9 is an end elevation of a stop of the fishing tackle of FIG. 8 prior to assembly, and FIG. 10 is a diagrammatic cross-section on the line 10—10 of FIG. 8.

DESCRIPTION OF THE PREFERRED EMBODIMENTS

Figure 4:
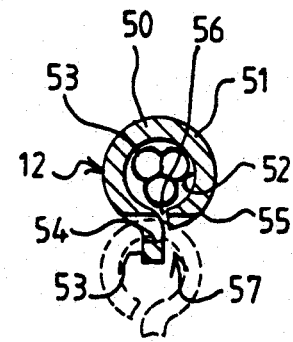
FIG. 4 is a section on the line 4—4 of FIG. 3.
Figure 5:
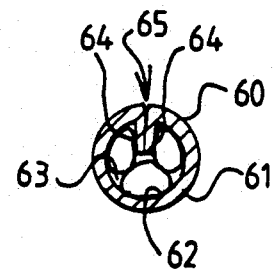
FIG. 5 is a section on the line 5—5 of FIG. 3.
Figure 1:
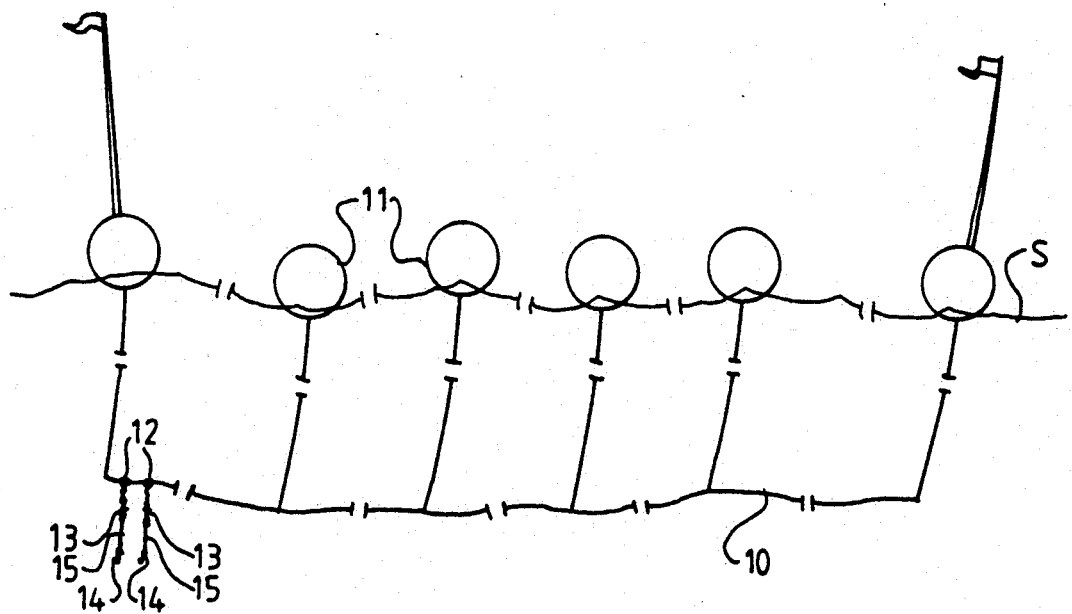
FIG. 1 is a diagrammatic illustration of fishing tackle comprising a long line having a plurality of snoods attached thereto.

Referring now to FIG. 1, there is shown a "hard lay" multi-strand long line 10, comprising a plurality of twisted together filamentary strands supported at a desired level below the surface S of the sea by fishing floats 11. The long line 10 may be of any desired length but is typically up to two or three kilometers in length although may be shorter or longer than this. At spaced positions along the length of the long line 10, for example at one meter or half meter intervals, are provided attachment members 12, to each of which is secured an intermediate member comprising a swivel 13 to which a hook 14 is connected by a snood 15.

Referring now particularly to FIGS. 2 and 3, each swivel 13 comprises a first eye 16 which is secured to the attachment member 12. The eye 16 is connected, in conventional manner, by a rotational joint 17 to a second eye 18 which is releasably connected to the snood 15.

The snood 15 comprises an elongate circular in cross-section body part 20 having a hook attachment means 21 at its "bottom" end and a line attachment means 22 at its "top" end and comprising a one-piece unitary structure made by moulding an intermediate product in an injection moulding apparatus, the intermediate product having the attachment means 21, 22, hereinafter to be described in more detail, moulded in their final form, and having a part corresponding to the body part 20 but of greater diameter but shorter length than the finished dimensions illustrated in the Figures. The part of the intermediate product corresponding to the body part 20 is heated and stretched by gripping the attachment means 21, 22 in relatively movable grippers and moving the grippers apart until the body part is formed to the final configuration shown in the Figures. The intermediate product has a stepped body part to provide the final dimensions illustrated.

Typically, the body part is heated by suitable means such as by contact with heater blocks and the stretching operation is performed over a period of time lying in the range 30 to 25 seconds whilst the body part is heated to a temperature lying in the range 130° to 220° C. where, as in the present case, the material of the snood is nylon. The blank is elongated such that the ratio of the maximum cross-section dimension (normally the diameter, since the body part would normally be of cylindrical configuration) of the elongate body part before and after stretching lies in the range 2:1 to 5:1 and the length of the snood is increased in the corresponding ratio. The snood has a diameter to length ratio lying, for example, in the range 1:600 and 1:1250.

With presently available moulding techniques it is not practicable to make a finished snood having a diameter to length ratio of, for example, at least 1:600 and hence it is not possible to mould a snood with integrally moulded attachment means and a body part of the required small diameter. In addition, a moulded snood, however thin, would generally have insufficient tensile strength and too much elongation. However, by moulding the attachment means integrally with an elongate part in an intermediate product, where the elongate part has a length of diameter ratio which can be moulded, and subsequently stretching the elongate part to the final desired length to diameter ratio a snood with moulded attachment means is provided in accordance with the present invention with added tensile strength and limited elongation.

Although in this example the snood comprises a monofilament of nylon, it may be made from monofilament of other suitable material (such as polyethylene or polyester) in which a snood blank can be moulded with integral attachment means and then the elongate parts are stretched to produce a snood of the desired final length to diameter ratio. Alternatively, the snood may be made from multifilament material by moulding attachment means on the multifilament and then performing a stretching operation such as described hereinbefore to produce an elongate body part of the desired length to diameter ratio.

In one example of a snood embodying the present invention an intermediate part was made in RILSAN II nylon by a conventional injection moulding technique. The elongate body part of the intermediate product was approximately 100 mm long and 3 mm diameter over the majority of its length but has parts of 3.75 mm diameter adjacent the ends.

The elongate part was heated to a temperature of 150° C. and the blank was stretched for a period of 20 seconds and the elongate part was stretched to increase the length thereof 4.25× its original length, i.e. to approximately 425 mm. There was a corresponding reduction in the diameter of the elongate part of the intermediate product so that the diameter of the intermediate product was approximately two times larger than the final diameter of the elongate body part of the snood, which was 1.5 mm diameter so far as the smallest diameter portion was concerned whilst the largest diameter of the end portion was correspondingly reduced.

The hook attachment means 21 comprises a generally stirrup shaped part comprising a transversely extending passageway 23 terminating in and extending between open mouths 23a, 23b disposed transversely to a longitudinal axis X—X of the fishing tackle. The passageway 23 is bounded at its bottom end by a transverse abutment part 24 having an abutment surface 24a and transversely facing side surfaces 25 in which grooves 25a are provided.

The transverse abutment part is thus pre-formed and extends transversely to a longitudinal axis X—X over a transverse extent which is greater than the diameter of the body part. The top end of the passage 23 is closed by a cross-head part 26 connected to the transversely extending abutment part 24 by side members 27. Inwardly projecting ribs 28 are provided on the inwardly facing surfaces 29 of the side walls 27.

The hook 14 comprises a body part in the form of a shank 30 having a conventional barbed hook shape 31 at its bottom end and a generally U-shaped configuration at its top end. The longer limb of the U is integral with the remainder of the shank 30 of the hook whilst the shorter limb 32 of the U terminates at a free end 33 and is connected to the longer limb 30 by a transversely extending part 34 which is rigid with the body part and projects rigidly therefrom in a predetermined transverse relationship, i.e. perpendicular to the axis X—X. The part 34 provides a retaining part which is spaced transversely from the shank. The shank and U-shaped parts of the hook are of circular cross-section.

The attachment means for the intermediate member comprising the swivel 13 is of the same configuration as the hook attachment means 21 provided at the other end of the snood and hence the description of the attachment means 21 contained hereinbefore is equally applicable to the attachment means shown at 22 and the same reference numerals have therefore been used in connection with the hook attachment means 22 as are used in connection with the hook attachment means 21.

The second eye 18 of the swivel 13 is of generally U-shape. That is to say, extending from the rotatable joint 17 is a part 120 comprising a shank 121 having at one end said rotatable joint 17 and at its other end limbs of generally U-shape configuration, the longer limb 119 of the U 123 being integral with the remainder of the shank 121, whilst the shorter limb 124 of the U terminates at a free end 125. The shank 121 is cranked so that the central axis of the U 123 is co-axial with the axis of rotation of the rotatable joint 117. The shorter limb 124 is connected to the longer limb 119 by a transversely extending part 126 and provides a retaining part which is spaced transversely from the shank 121. The shank and U-shaped parts of the swivel are of circular cross-section.

The distance between the abutment surface 24a and an opposed surface 35 of the cross-head 26 approximates to the length of the shorter limb 124 of the U 123, i.e. the distance between the free end 125 and a tangent to the outer surface of the base part 126.

In use, the shorter limb 124 is fed transversely through the passageway 23 until the limb 119 engages one of the grooves 25a, whereupon the swivel is moved longitudinally in the direction of the axis X—X to move the base of the U past the opposed ribs 28 so that the ribs abut against the curved surface of the base of the U 123 and serve to retain the swivel with the abutment surface 24a in engagement with the inner surface of the part 126 of the swivel. The shorter limb 124 is received within the other groove 25a and hence the transverse abutment part 24 is embraced by the shank 121, transversely extending part 126 and retaining part 124 of the swivel.

The intermediate member comprising the swivel 13 is therefore retained releasably in attachment with the snood by the attachment means 22 by virtue of releasable mechanical interengagement therewith. If it is desired to replace the snood, it is simply necessary to manipulate the swivel initially axially parallel to the axis X—X to move the part 126 past the ribs 28 and then to withdraw the retaining part 124 transversely from the passageway 23.

In the embodiment illustrated, the attachment means 21 and 22 are identical and thus a hook or swivel can be attached to either end of the snood. If desired, however, the attachment means 22 may be of different size to the attachment 21, although of the same general configuration, if it is found convenient to make the attachment means for connection to the hook either larger or smaller than the attachment means for connection to a swivel and of course the corresponding parts of the hook and swivel would be correspondingly dimensioned.

In the case of the above described example the tensile strength of the snood was measured and was found to be 67218 lbs per sq. inch (463468 kPa). The assembly failed in the elongate part of the snood, well spaced from the attachment means, thereby demonstrating that the attachment means do not comprise the weakest part of the assembly snood as was frequently the previous case when a conventional hitch or other knot comprised the attachment means.

Referring now to FIGS. 6 and 7, a modification is illustrated which, except as hereinafter described, is the same as the previously described embodiment. The same reference numbers have been used in FIGS. 6 and 7 as were used in FIGS. 1 to 5 for corresponding parts but with a prefix of 5.

The hook attachment means 521 comprises a generally stirrup shaped part comprising a transversely extending passageway 523 bounded at its bottom end by a split transverse abutment part 524 having a pair of abutment surfaces 524a, 524b and transversely facing side surfaces 525 in which grooves 525a are provided.

The transverse abutment part is thus pre-formed and extends transversely to a longitudinal axis X—X of the body part 520 over a transverse extent which is greater than the diameter of the body part. The top end of the passage 523 is closed by a cross-head part 526 connected to the transversely extending abutment part 524 by side members 527. Inwardly projecting ribs 528 are provided on the inwardly facing surfaces of the side walls 527.

A resilient biasing means 620 is mounted on the stirrup shaped part to bias the side members 527 together and hence normally to maintain the abutment surfaces 524a, 524b together. However, when a longitudinal force is imposed on the abutment surfaces 524a, 524b in use when the snood assembly is passed through a suitable apparatus to remove fish from the fishing tackle, the resultant force forces the abutment surfaces 524a, 524b apart against the bias of the resilient biasing means 620. There is thereby provided a facility whereby hooks may be automatically released from the fishing tackle simply by applying a suitable longitudinal force to the hooks, for example by appropriately urging a fish impaled on a hook.

The bias provided by the resilient biasing means is arranged so that the hook remains attached to the snood until the longitudinal load exceeds a predetermined value.

The resilient biasing means 620 comprises a spring steel sleeve in the form of a generally cylindrical tubular body 621 made by stamping a generally rectangular blank from a sheet of material and then rolling the blank to cylindrical tubular shape leaving a longitudinally extending gap 622 between the adjacent edges of the blank after forming to tubular shape so as to leave an opening for the transversely extending part 534 of the hook 514. The sleeve is also provided with a diametrically opposite slot 623 which extends only partially longitudinally of the sleeve to permit passage of the transversely extending part 534 and the retaining part 532 of the hook 514. The hook attachment means 521 is provided with collar or flange parts 624,625 at opposite ends which project slightly outwardly compared with the remainder of the attachment means therebetween so as to provide retaining flanges for the sleeve 620. The inherent resilience provided by the sleeve 620 serves to urge the side members 527 together and again the mode of operation is as in the previously described embodiments.

If desired any other suitable resilient biasing means may be provided, either separately or formed integrally. For example, a suitable spring steel or other material resilient biasing means may be moulded integrally with the hook attachment means 521 so as to be embedded therein if desired. Alternatively the material of which the hook attachment means is formed may have sufficient resilient bias to retain the hook depending upon the longitudinally extending load of which it is desired that the hook becomes released.

The hook 514 comprises a shank 530 having a conventional barbed hook shape 531 at its bottom end and a generally U-shaped configuration at its top end, the longer limb of the U being integral with the remainder of the shank 530 of the hook whilst the shorter limb 532 of the U terminates at a free end 533, is connected to the longer limb 530 by a transversely extending part 534 and providing a retaining part which is spaced transversely from the shank. The shank and U-shaped parts of the hook are of circular cross-section.

The distance between the abutment surfaces 524a, 524b and an opposed surface 535 of the cross-head 526 approximates to the length of the shorter limb 532 of the U, i.e. the distance between the free end 533 and a tangent to the outer surface of the base part 534.

In use, the shorter limb 532 of the hook is fed transversely through the open mouth 523a into the passageway 523 until the shank 530 engages one of the grooves 525a whereupon the hook is moved longitudinally in the direction of the axis X—X to move the base of the U past the opposed ribs 528 so that the ribs abut against the curved surface of the base of the U and serve to retain the hook with the abutment surface 524a, 524b in engagement with the inner surface of the part 534 of the hook. The shorter limb 532 is received within the other groove 525a and hence the transverse abutment part 524 is embraced by the shank 530, transversely extending part 534 and retaining part 532 of the hook. The hook 514 is therefore retained releasably in attachment with the snood by the attachment means 521 by virtue of releasable mechanical inter-engagement therewith. If it is desired to replace the hook, it is simply necessary to manipulate the hook initially axially parallel to the axis X—X to move the part 34 past the ribs 28 and then to withdraw the retaining part 32 transversely from the passageway 523.

The line attachment means 22 is the same as the line attachment means 22 described with reference to FIGS. 1 to 5.

The first eye 16 of the swivel 13 is secured to the attachment member 12. The attachment member 12 comprises a sleeve 50 having a generally cylindrical external wall 51 and a generally cylindrical internal wall 52 which defines a passage 53 in which the line 10 is received. The diameter of the passage 53 is such that the sleeve 50 is free to rotate on the line 10 with the line in direct contact with the wall 52.

The sleeve 50 is made from an initially flat blank of suitable material, in the present example stainless steel, of generally rectangular configuration but with one edge formed to substantially triangular shape, as best shown in FIG. 3. The blank is then formed to the configuration best shown in FIG. 4 so as to form the above described generally cylindrical external and internal walls, 51, 52 whilst the generally triangular part is bent outwardly so as to form a lug 53 and an aperture 54 is formed in the lug 53 and partly in a portion 55 of the sleeve adjacent the lug 53.

The portion 55 has a free end surface 56 which is disposed in contact with or closely spaced from the lug 53. The first eye 16 of the swivel 17 is received within the aperture 54 to secure the swivel 17 to the sleeve 50.

The sleeve 50 is initially formed so that a relatively wide slit 57 is provided between the end surface 56 and the lug 53 to permit passage of the line 10 therethrough and then the sleeve is formed so as to close or substantially close the slit 57 so as to retain the line 10 within the passage 53.

In order to prevent movement of the attachment members 12 longitudinally of the line 10 a pair of stops 60 is provided at opposite ends of each sleeve 50. Each stop comprises a clip in the form of a loop or ring of rectangular cross-section having a dimension in the longitudinal direction of the line 10 which is approximately 2.7 times its thickness. Each stop is generally annular and has a generally cylindrical external wall 61 and a generally cylindrical internal wall 62 which defines a passage 63 in which the line 10 is received with the wall 62 in direct contact with the line 10. If desired the walls 61 and 62 may be other than cylindrical, for example they may be generally oval or generally triangular. Each stop is also provided with a pair of inwardly extending parts 64 formed as inturned end portions of the ring. Each clip 60 is made from a strip of rectangular cross-section material such as stainless steel of suitable type. The strip is cut to length to form a blank and the blank is then bent to provide the above described generally annular shape with inwardly extending parts 64 but with a gap 65 provided between the inturned portions 64 which gap is initially of sufficient width to permit of passage of the line 10 therethrough into the passage 63. Thereafter the stop is formed to the configuration shown in FIG. 5 where the gap 65 is closed or substantially closed to retain the stop on the line 10 and, in addition, the inwardly projecting parts 64 are caused to penetrate into the line 10 by separating the strands of which the line 10 is made. Because the line is a "hard lay" line the line tends to move relative to the clips to enable the part 64 to pass between a pair of adjacent strands and, in addition, the line is not reduced in diameter by the closing operation of the clips to any significant extent so that the clips grip tightly on the line and stand proud of the line adequately to function as clips.

Referring now to FIGS. 8-10.

The line, shown at 10', comprises a "soft lay" multi-strand long line comprising twisted together filamentary strands.

Except for the "soft lay" nature of the line 10 and for the stops 60' hereinafter to be described, this embodiment is otherwise as described with reference to FIGS. 1-7 and hence the attachment member 12, intermediate member comprising the swivel 13 and snood 15 are identified by the same reference numerals in FIG. 8 as were used in FIGS. 1-7 and do not require further discussion.

Because the line 10' in the present embodiment is a "soft lay" line the configuration of stop described with reference to FIGS. 1-7 is not used because with a "soft lay" line instead of the line moving relative to the clip to enable the part 64 to pass between a pair of adjacent strands, there is a tendency for the part 64 to penetrate a strand and to damage the filaments thereof and thus weaken the line. In addition, with a "soft lay" line there is a tendency for the line to be reduced in diameter by the clip closing operation with the effect that the clip is not adequately anchored to the line and/or the clip is reduced in diameter compared with the uncompressed diameter of the line such that the clip does not project outwardly above the surface of the line adequately to enable the clip to function as a stop.

Accordingly, in this embodiment the stop comprises a pair of clips 60' each clip being generally in the form of an annulus having a generally cylindrical external wall 61' and a generally cylindrical internal wall 62' provided with three generally radially extending projections 64 and providing a passage 63' in which the line 10' is received with the wall 62' in direct contact with the line 10' and with the inwardly extending parts 64' embedded in the material of the line 10' as best shown in FIG. 10.

In addition, the inwardly extending projections 64 are spaced and configured to ensure that they pass between adjacent strands of the line. In particular the end portions 64'a are formed to convexly curved configuration with a view to ensuring that the projections do not penetrate into individual strands of the line and hence damage to individual fibres of the line is avoided.

Referring now to FIG. 9, each stop 60' is made by stamping from a sheet of suitable material such as stainless steel of appropriate grade to form an initial configuration as shown in FIG. 9 where a gap 65' is provided between end parts 65'a of the clip. The gap 65' is initially of sufficient width to permit of passage of the line 10' therethrough into the passage 63 as shown in chain dotted line in FIG. 9.

The gap 65' is then closed or substantially closed to retain the stop on the line 10' and, in addition, the inwardly projecting parts 64' are caused to penetrate into the line 10' as shown in FIG. 10.

The end parts 65'a are made of a chamfered curved configuration to provide a recess 65'b adjacent the ends of the loop to accommodate a part of the rope and hence avoid damage to the rope which could otherwise occur if the end parts of the loop were of a sharp edge configuration which could trap individual fibres of the rope therebetween and cause damage or severing thereof. Of course, the end parts 65'a may be of any desired configuration to provide a recess of any appropriate shape to avoid damage to the rope.

In all embodiments it is intended that the sleeves 50 and associated stops 60, 60' will be positioned on the line 10, 10' in a factory environment and that the swivels 17, snoods 15 and hooks 14 will also all be assembled in the factory.

If, however, it is desired to replace any of these components on board ship, then this can be easily done.

A hook can be engaged with the snood as described hereinbefore and similarly a snood can be engaged with a swivel as described hereinbefore.

A swivel 17 can be engaged with a sleeve 50 by disposing the eye 16 in the aperture 54 of a desired sleeve 50 with the eye being adequately open to permit engagement with the aperture 54 and subsequently closed to the extent necessary to retain the swivel in position.

Replacement attachment members 12 are supplied with the slits 57 in a sufficiently wide condition to permit passage of the line 10, 10' following which the slit 57 is closed to the extent necessary to retain the sleeve 50 on the line 10, 10' and similarly stops 60, 60' are provided with the gaps 65, 65' thereof in a sufficiently wide condition to permit passage therethrough of the line 10, 10' followed by subsequent closing of the slit 65 to the extent necessary and penetration of the inwardly extending part 64 into the line. Suitable tools may be provided to facilitate the above described closing operations of the sleeve and stops.

The stops 60, 60' may be positioned immediately adjacent the ends of the associated attachment member 12, or spaced therefrom at a desired distance to prevent, in both cases, movement of the attachment member longitudinally of the line although wherein the stops are spaced from the attachment member limited sliding of the stop relative to the line is permitted.

The above described attachment members permit a snood to be rotated around the longitudinal axis of the line 10, 10' and also to pivot freely about two orthogonally disposed axes, one of which lies parallel to the line 10, 10' and the other of which lies transverse to the line 10, 10', as well as being permitted to rotate about its own longitudinal axis by virtue of the swivel 17. The attachment member allows the snood to extend parallel or substantially parallel to the longitudinal axis of the line as well as perpendicular to the line and as well as tangential to a circle which is normal to said longitudinal axis and, of course, in any intermediate direction. Of course, the nature of the interconnection between the swivel 13 and the attachment member 12 is such that the above described orthogonally disposed axes are conceptual rather than being physically defined axes. The important thing is that the snood can pivot freely in such a way that it is able to pivot about the above described conceptual orthogonally disposed axes even though the pivotal connection is more in the nature of a universal type joint. The pivotal and rotational connection described ensures that there is no snarling up of the tackle in use even if rotation of an attachment member about the long line is prevented or restricted, in use, which, of course, would otherwise be a major problem bearing in mind the typical long length of the line and the large number of snoods.

The long line illustrated comprises three twisted together filamentary strands, each strand being made up of a plurality of fibres. If desired the long line may have a different number of strands and, if desired, the clip 60' may be formed with a corresponding number of inwardly projecting parts or a different number of inwardly projecting parts than the number of strands and positioned so as to penetrate between adjacent strands. The rope may be of any suitable lay specification and the strands may be of any desired construction. If desired plaited rope may be used where strands are plaited together as opposed to being twisted together.

The features disclosed in the foregoing description, or the following claims, or the accompanying drawings, expressed in their specific forms or in terms of a means for performing the disclosed function, or a method or process for attaining the disclosed result, or a class or group of substances or compositions, as appropriate, may, separately or in any combination of such features, be utilised for realising the invention in diverse forms thereof.

I claim:

1. A fishing tackle comprising
a line,
an attachment member comprising a generally cylindrical
sleeve rotatably mounted directly on the line,
the sleeve having,
a wall defining a generally cylindrical passage in which the line is received with the wall contacting the line,
a generally outwardly extending lug comprising an attachment means,
a slit in the cylindrical wall extending longitudinally of the sleeve and the slit being disposed at the base of the lug, the slit having an initial width to permit the line to pass therethrough into said passage and the clip having been deformed to close the slit to retain the line in the passage;
an intermediate member comprising
a first connecting element of loop configuration that inter-engages with an opening in said lug to secure the intermediate member to the attachment means to enable the intermediate member to move relative to the attachment member about two relatively perpendicular axes of rotation, a second connecting element
the first and second elements being interconnected to permit a rotation of the second element relative to the first element about a further axis
a snood connected to the second element;
a hook connected to the snood; and
a pair of stop means to prevent movement of the attachment member along the line,
the stop means comprising,
a pair of clips disposed adjacent opposite ends of the sleeve and
each clip having a loop provided with a gap between end parts of the loop and the loop being at least substantially closed around the line whereby a part of the clip of smaller dimension than the cross-section of the line penetrates the line.

2. A fishing tackle according to claim 1 wherein the sleeve is made from an initially flat blank and if formed by bending said blank to a cylindrical shape provided with said lug, the slit being formed between one free end of the blank and a surface portion of the lug adjacent the base thereof.

3. A fishing tackle according to claim 1 wherein the line comprises twisted filamentary strands and each clip has at least one inwardly extending part which penetrates into the line between the strands.

4. A fishing tackle according to claim 3 wherein each clip is generally circular in cross-section and has two inwardly extending parts disposed side by side and extending generally radially inwardly.

5. A fishing tackle according to claim 4 wherein each clip is initially provided with a gap between said inwardly extending parts of a width to permit passage of the line therethrough, following which the clip is closed onto the line to bring the inwardly extending parts into contact or closely adjacent each other and to cause them to penetrate the line between the strands.

6. A fishing tackle according to claim 4 wherein each clip is made of bent strip material of generally rectangular cross-section.

7. A fishing tackle according to claim 3 wherein each clip has a plurality of generally radially inwardly extending parts which are disposed at spaced positions around the inner surface of the loop and are of such configuration as to penetrate the line between the strands.

8. A fishing tackle according to claim 7 wherein each clip is initially provided with a gap between end parts of the loop, the gap being of a width to permit passage of the line therethrough, following which the clip is closed onto the line to at least reduce the width of the gap and to cause said parts to penetrate the line between adjacent strands.

9. A fishing tackle according to claim 3 wherein the loop of each clip has a wall which contacts the line and the wall has a recess therein adjacent the ends of the loop to avoid damage to the rope.

10. A fishing tackle according to claim 7 wherein the clip is made from a blank by a severing operation.

11. A fishing tackle according to claim 1 wherein the intermediate member is generally elongate and the further axis of rotation of the second connecting element relative to the first connecting element comprises a longitudinal axis of the intermediate member.

12. A method of assembling a fishing tackle comprising a line,
an attachment member comprising a generally cylindrical sleeve
rotatably mounted directly on the line,
the sleeve having,
a wall defining a generally cylindrical passage in which the line is received with the wall contacting the line,
a generally outwardly extending lug comprising an attachment means,
a slit in the cylindrical wall extending longitudinally of the sleeve and the slit being disposed at the base of the lug, the slit having an initial width to permit the line to pass therethrough into said passage and the clip having been deformed to close the slit to retain the line in the passage;
an intermediate member comprising
a first connecting element of loop configuration that inter-engages with an opening in said lug to secure the intermediate member to the attachment means to enable the intermediate member to move relative to the attachment member about two relatively perpendicular axes of rotation,
a second connecting element
the first and second elements being interconnected to permit a rotation of the second element relative to the first element about a further axis
a snood connected to the second element;
a hook connected to the snood; and
a pair of stop means to prevent movement of the attachment member along the line,
the stop means comprising, a pair of clips disposed adjacent opposite ends of the sleeve and each clip having a loop at least substantially closed around the line to penetrate the line wherein the method comprises passing the line through said slit into said passage and then deforming the attachment member to close the slit at least substantially so that the attachment member is mounted on the line with the wall of the passage in contact with the line and able to rotate about the line.

13. A method according to claim 12 including the further step of securing said stop means to the line by passing the line through a gap in each clip and then deforming each clip so as to encircle the line and cause a portion of each clip to penetrate the line.

* * * * *